US010810023B1

(12) United States Patent
Hamze

(10) Patent No.: US 10,810,023 B1
(45) Date of Patent: Oct. 20, 2020

(54) DYNAMIC MODELER

(71) Applicant: Hayssam Hamze, Dubai (AE)

(72) Inventor: Hayssam Hamze, Dubai (AE)

( * ) Notice: Subject to any disclaimer, the term of this patent is extended or adjusted under 35 U.S.C. 154(b) by 0 days.

(21) Appl. No.: 16/919,764

(22) Filed: Jul. 2, 2020

Related U.S. Application Data

(63) Continuation of application No. 16/835,066, filed on Mar. 30, 2020.

(51) Int. Cl.
*G06F 9/451* (2018.01)
*G06F 16/903* (2019.01)

(52) U.S. Cl.
CPC ........ *G06F 9/451* (2018.02); *G06F 16/90335* (2019.01)

(58) Field of Classification Search
CPC ..................................................... G06F 9/451
See application file for complete search history.

(56) References Cited

U.S. PATENT DOCUMENTS

2017/0235848 A1* 8/2017 Van Dusen ........... G06F 16/904
705/12
2018/0181716 A1* 6/2018 Mander .............. G06Q 10/0633

\* cited by examiner

*Primary Examiner* — Maryam M Ipakchi
(74) *Attorney, Agent, or Firm* — Fish & Richardson P.C.

(57) ABSTRACT

Methods, systems, and apparatus, including computer programs encoded on computer storage media, for dynamically modeling a page using dynamic data. One of the methods includes receiving a first dynamic input request with corresponding contextual inputs comprising data characterizing a single dynamic first event of a main task; generating, in response to the first dynamic input request, a dynamic smart interface responding to the contextual inputs; generating, in response to the first dynamic input request, a model comprising a single shared dynamic control load and dynamic data load responding to the contextual inputs; receiving a second dynamic input request comprising data characterizing a single dynamic final event of the main task; triggering, in response to the second dynamic input request, a dynamic process comprising a rule monitor, a smart task generator, and a smart contract; and presenting, to a user in response to the second dynamic input request, dynamic rule options.

18 Claims, 5 Drawing Sheets

DYNAMIC MODELER

CROSS-REFERENCE TO RELATED APPLICATION

This application is a continuation of, and claims priority to, U.S. application Ser. No. 16/835,066, filed Mar. 30, 2020. The disclosure of the foregoing application is incorporated here by reference.

BACKGROUND

This specification relates to interactive user programs.

Computing platforms and network-connected personal computing devices allow different users to create and interact with content across multiple devices. Some conventional platforms manage the distribution of content to users and process user commands to facilitate various actions. In some conventional platforms, a user must send multiple user commands across multiple interfaces presented to the user by the platform to complete a given task.

SUMMARY

This specification describes a dynamic modeler for dynamic user interface interaction on a single platform by configuration only. The dynamic modeler can generate, for all applications, i) a single shared first event, ii) a single shared dynamic cascading filter, and iii) a single shared final event, powered by an application's context and based on a resource event triggering a smart task to auto-generate the next tasks and their correspondent institutions and resources. The dynamic modeler can provide set standardized reporting, reconciliation, and output documents. These features can achieve an integrated-solution platform ecosystem for IoT and non-IoT resources.

The features of the dynamic modeler include: 1.) Dynamic Smart Interface, which can include a Home Page, a Dynamic Form which includes a cascading data structure with associated Dynamic Controls and Data Load, and Rule Options (e.g., right click, burger menu, or action prompt list), which can support API inputs, Voice Commands, and/or one or more Dynamic Interaction Types (i.e., input types that the generated interface can accept); 2.) Dynamic Interaction Types, which can include a Single Dynamic First Event and a Single Dynamic Final Event (which can each be received from Voice, API, and/or Clicks); 3.) Dynamic Process Manager, which can include a Rule Monitor, a Smart Task Generator (for both M-Tasks and C-Tasks), and a Smart Contract system; 4.) Contextual Dynamic Data, which can include an output model profile and intelligent resource interaction (IM); and 5.) Dynamic Report Viewer, which can include Set Standardized Reporting, dynamic reconciliation of contextually connected data, and output documents.

The dynamic modeler can include a home page that includes both i) a Central Task Hub for main tasks (M-Tasks) and communicator tasks (C-Tasks) and ii) one or more action menus. Based on a configuration-only setup with no developer input, the dynamic modeler is designed to read and write from multiple databases, allowing IOT and non-IOT resources to collaborate on different devices on a single platform. The platform can support a wide range of device resources, including, e.g., mobile, desktop, and IOT devices.

This collaboration between a sender and a recipient is maintained by the process manager with its dynamic rule monitor to auto-generate a Main Task when a single or a set of conditions are met, based on the output model profile or IRI, offering the targeted resources a single or a set of rule options to allow the execution of a task by an update from an API, a voice command, or a click type, followed by a single dynamic final event to trigger the task generator and set a next new Main Task.

Or, alternatively, the resource can trigger a C-Task to create a targeted field action form to select specific fields from the M-Task page that needs to be actioned against. This C-Task is sent to one or more recipients, e.g., other users or IoT devices, to execute the necessary actions. Once executed, the initiating user can validate and post the requested data back into the M-Task and trigger the necessary corrective action between a mobile device and desktop, without the need of manual mapping, thereby ensuring data integrity.

The dynamic process manager queries the modeler's dynamic data context, allowing a single API to write or read from a smart contract in real time whenever required by the process manager based on the rule monitor.

The above features allow the platform to continuously render any dynamic output model. By following the configured processes and rules as required by the resource, the platform can maintain traceability along the process flow. The configured processes can be dynamic; that is, according to a particular configuration of the dynamic modeler, the configured processes can be dynamic in response to particular contextual data. The resource can be a user, an IoT device, or any other appropriate resource that interacts with the platform. The dynamic control load and dynamic data load features ensure that the resource is only presented with options and content that are necessary to interact with and update a particular output model based on the contextual dynamic data.

EXAMPLES

As a particular example, the interactive program can be a project management program, where using one or more Main Tasks one or more users or IoT devices can collaborate to complete a project. To begin the project, a resource can start with a planning Main Task supported by IRI, which will assist by comparing similar current and historic projects to confirm budgeted allocations are viable and optimized. The resource completing the planning Main Task can then match available and suitable resources based on the project requirements and issue C-Tasks to the available resources to accept or reject their involvement in the project which will be posted back into the planning Main Task for final review by the resource.

If the rule monitor determines that there is a discrepancy in the received response to a particular task, it will prompt or escalate to the applicable resource and give the resource one or more rule options (e.g., to reduce, increase the resources, change the budget, amend project phases etc.). As a particular example, a first resource might submit a request to begin a project that will cost a certain amount of money. This can trigger the creation of an M-Task for a second user to approve the request. The second resource might approve the request, but the rule monitor can process the response of the generated M-Task and determine that the there is a discrepancy between the response and the output model profile of the dynamic modeler. For example, the rule monitor can flag the response of the second resource because the amount of money is so high that the request requires further approval by a third resource. The rule monitor can then automatically generate an M-Task or a C-Task for the third resource to review the request.

As another particular example, the interactive program can be commercial transaction program that manages a transaction between a customer and a business. In this case, each task in the transaction can be assigned either to the customer or to an employee of the business. Here, the customer and business can leverage the capabilities of the smart contract interaction with the dynamic modeler to establish trust.

Once the customer has accepted the terms and conditions offered by the business, the terms and conditions will be part of the transaction flow of the dynamic modeler, and will then be recorded on a Smart Contract, to ensure integrity of the set terms. If at any point in the transaction the Rule Monitor evaluates a discrepancy between the conduct of the parties in the transaction and the set terms recorded in the Smart Contract, it will suggest or trigger a Rule Option, to apply a corrective action pursuant to the terms recorded in the Smart Contract.

Advantages

With a dynamic single request input, a dynamic modeler can pass contextual parameterized commands across any process and issue a render command to produce a window dynamically, which will contain all of the required controls, awaiting a user event which then triggers commands. The list of controls (e.g., drop down, save, etc.) is always contextual and does not require any developer input.

Particular embodiments of the dynamic modeler described in this specification can be implemented so as to realize one or more of the following advantages.

The platform is dynamic. This means that the modeler can auto-adjust its process model output, which is based on i) the output model profile, ii) a resource type, iii) regional or institution regulations, and/or iv) computed fields which have been created by 'configuration only' without the need for additional computer language, enabling continuous integration of multiple applications onto the single platform. The platform can also leverage one or more machine learning models to learn patterns from historical data. For example, the platform can process historical data generated by both users of the platform and IoT devices of the platform using a machine learning model to predict a behavior of the users and IoT devices in the future.

The dynamic modeler can thus generate a fully contextual task (either an M-Task or a C-Task) with its set of correspondent resources which are supplied with a full transaction context and set of restrictions. The modeler is furthermore supported by transaction tracking features for all tasks, while limiting the available tracking features for each resource to the context which the resource should have access to.

The dynamic modeler enables the devices and users of the system to communicate via C-Tasks on past, current, or upcoming tasks. The C-Tasks can target a specific step or a specific field within a step of an M-Task to generate a form or request an action. The feedback in response to the C-Task can be auto-posted to the M-Task or subject to sender confirmation after processing the response using the Rule Monitor, based on the smart contract terms. The dynamic modeler can then create a new task with its specific Rule Options. The interaction between M-Tasks and C-Tasks, for example using an integrated chat extension, allows users and other resources to seamlessly interact to complete the tasks.

In particular, a team that uses the dynamic modeling system might not need to hire developers to modify the system for the particular needs of the team or integrate any $3^{rd}$ party APIs. Once the necessary context data is obtained, the content of each output model generated by the dynamic modeler can be automatically generated by the system to include all data necessary for the particular use case without any additional engineering or hard-coding of use-case specific information. This can allow projects to be completed more quickly and with fewer errors, as developer input can introduce delay, inaccuracy, and subjectivity.

In this specification, a platform is "integrated-solution" if a resource of the platform can execute tasks on the platform without needing to use any other applications or platforms. For example, some techniques described in this specification allow for different business lines within the same company, as well as different businesses collaborating on the same transaction, to communicate with each other using a single platform. All information necessary for each member of each business line to complete a respective task is available on the platform, and so no additional exchange of information, e.g., through other applications such as email or instant messaging, is required. That is, the user does not have to collect and synthesize information from multiple different sources, e.g., juggling multiple emails, instant messages, and notifications from respective platforms; the user only needs to interact with a single platform to receive all required information.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
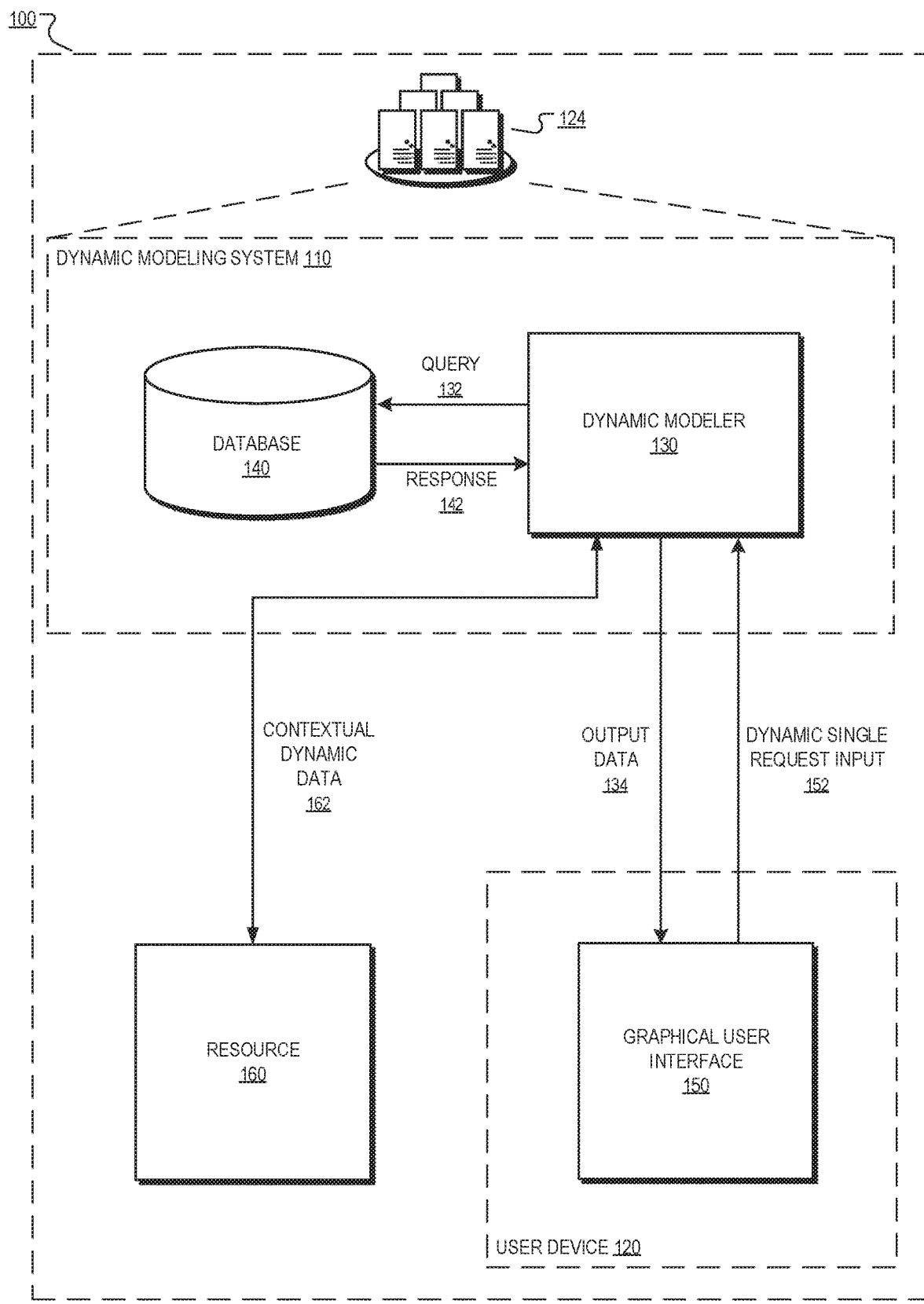
FIG. 1 is a block diagram of an example system.

FIG. 1 is a block diagram of an example system 100. The system 100 includes a dynamic modeling system 110, a user device 120, and a resource 160. The dynamic modeling system 110 generates output of an interactive user program to be displayed for a user on the user device 120.

The dynamic modeling system 110 includes one or more databases 140 and a dynamic modeler 130. In some implementations, the dynamic modeling system 110 can be hosted within a data center 124, which can be a distributed computing system having hundreds or thousands of computers in one or more locations. In some other implementations, certain portions of the dynamic modeling system 110, e.g., the dynamic modeler 130, can be executed locally on the user device 120, while other portions of the dynamic modeling system 110, e.g., the database 140, are hosted within the data center 124.

The user device 120 can include personal computers, tablet devices, mobile phones, or other computing devices. The user device 120 includes a display device that can present a graphical user interface 150. The graphical user interface 150 can display a current page of the interactive user program. For example, the graphical user interface 150 can display a home page of the interactive user program that includes a list of one or more tasks that have been assigned to the user. Each task can be a part of a sequence process that defines a transaction. Example tasks and transactions are discussed below in reference to FIG. 2.

The user can interact with the graphical user interface 150 to send a dynamic single request input 152 to the dynamic modeler 130. The dynamic single request input 152 can be one of multiple different dynamic interaction types, e.g., a single dynamic first event or a single dynamic final event, which are discussed in more detail below with reference to FIG. 2. The dynamic single request input 152 can be received, e.g., from a voice command, an API command, or a click or other interaction with an input device of the user device 120. For example, the user device 120 can include one or more input devices for receiving user input including, e.g., a keyboard, mouse, or touch sensitive display.

The dynamic single request input 152 can include data characterizing the interaction of the user with the current page displayed on the graphical user interface 150. As a particular example, the current page can be a home page that includes a task hub that i) lists one or more tasks assigned to the user and ii) allows a user to generate new tasks. In this case, the user can send a dynamic single request input 152 by selecting one of the tasks listed on the page. Here, the dynamic single request input 152 can include data characterizing the particular task that the user selected using an input device of the user device 120.

The dynamic modeler 130 can use the data included in the dynamic single request input 152 to generate a task to send a query 132 to one or more databases 140. Upon receiving a response 142 to the query 132 from the one or more databases 140, the dynamic modeler 130 can use data included in the response 142 to dynamically generate an output model according to the particular user and the dynamic single request input 152 that was received. For example, the modelled output can present a set of prompts for the user to complete a task that is identified in the dynamic single request input 152. This process is described in more detail below with reference to FIG. 2.

The dynamic modeler 130 can then send output data 134 to the user device 120. The output data 134 includes data characterizing the modelled output. For example, the output data 134 can include render data that can be used by the graphical user interface 150 to render the modelled output for the user.

The dynamic modeler 130 can also interact with the resource 160 in order to update contextual dynamic data 162 of the dynamic modeling system 110 that is stored in the database 140. The resource 160 can be any appropriate resource of the dynamic modeling system 110, e.g., another user device, an IoT device, a non-IoT device, etc. The interaction between the dynamic modeling system 110 and the various resources 160 of the dynamic modeling system 110 is described in more detail below.

Figure 2:
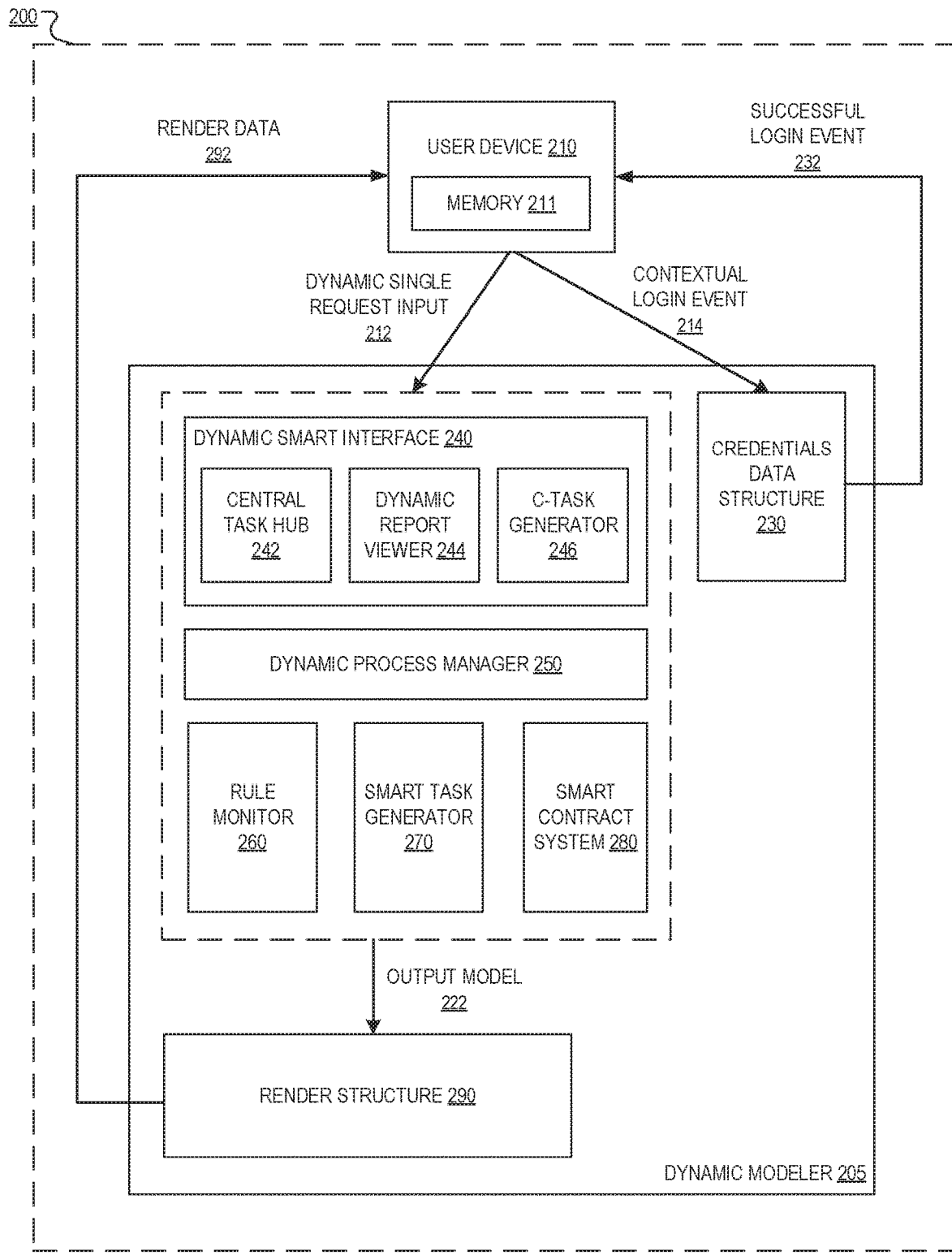
FIG. 2 is a block diagram of an example dynamic modeler interacting with a user device.

FIG. 2 is another diagram of an example dynamic modeling system 200 that includes a dynamic modeler 205 interacting with a user device 210.

The user device 210 can send events to the dynamic modeler 205 to allow a user to interact with a program to execute one or more tasks.

As a particular example, the user can provide credentials, e.g., a username and password, to the user device 210. The user device 210 can then send a contextual login event 214 to the dynamic modeler 205, with contextual dynamic data that includes the credentials of the user. A credentials data structure 230 of the dynamic modeler 205 can receive the contextual login event 214 and use the contextual login event 214 to validate the credentials of the user. Upon validation of the user's credentials, the credentials data structure 230 can send a successful login event 232 to the user device 210. The successful login event 232 can include data that allows the user device 210 to interact with the dynamic modeler 205 as a fully-credentialed user. The successful login event 232 can also include data for rendering a landing page that the user device 210 can use to render the first page of the program that the user will see.

The user device 210 can include a memory 211 that can store data related to the dynamic modeler 205, e.g., contextual dynamic data that is sent to the user device with the login event 232. While the dynamic modeler 205 is depicted as separate from the user device 210, in some implementations, the dynamic modeler 205 is a part of the user device 210; in this case, the memory 211 of the user device 210 can enable the operations of the dynamic modeler 205.

For example, the landing page can be a home page that includes a Central Task Hub and one or more action menus. The Central Task Hub can include a list of tasks assigned to the user, including main tasks (M-Tasks) and communicator tasks (C-Tasks). M-Tasks are assigned as part of the sequenced process of a transaction, to execute a particular task of the transaction. C-Tasks are tasks that are created during the course of a parent M-Task by a resource of the dynamic modeler to which the M-Task is assigned, or by the rule monitor of the dynamic modeler, in order to communicate with another resource associated with the dynamic modeler 205 to obtain information needed to complete the parent M-Task. A resource can be any entity, e.g., a user or an IoT device, that can be assigned a task, e.g., a C-Task for providing information related to an M-Task. That is, every C-Task has a parent M-Task, and after a C-Task is completed by the other resource, the user to which the parent M-Task was assigned can use the information included in the completed C-Task to complete the parent M-Task. The action menus of the Central Task Hub can include controls that allow a user to generate a new M-Task or a new C-Task associated with a particular M-Task.

Each C-Task can have a particular type. For example, a C-Task can be an initiator C-Task, a chat C-Task, a notification C-Task, a decision C-Task, or a collection C-Task.

An initiator C-Task can trigger the creation of an M-Task. The creation of an initiator C-Task can cause the dynamic modeler 205 to send data characterizing the new M-Task to a recipient resource of the dynamic modeler 205, as specified by the initiator C-Task.

A chat C-Task can enable two resources of the platform to communicate directly in real-time. For example, if a user is unsure how to proceed with a particular M-Task that is assigned to the user, then the user can generate a chat C-Task for a supervisor of the user. The dynamic modeler 205 can then present the chat C-Task to the supervisor in real-time, e.g., by opening a chat window between the user and the supervisor. The user and the supervisor can then communicate about the particular M-Task. In some implementations, each chat C-Task must be associated with a specific M-Task; that is, a user cannot send messages to other users of the dynamic modeler 205 that are unrelated to a specific M-Task.

A notification C-Task can be triggered by an M-Task to provide a notification to a resource of the dynamic modeler 205. A notification C-Task for providing a notification to a recipient resource can either be automatically generated by a rule monitor 260 of the dynamic modeler 205, or by an initiating resource of the dynamic modeler 205. The rule monitor 260 is discussed in more detail below.

For example, from a page of the dynamic smart interface 240 corresponding to a particular M-Task assigned to an initiating user of the dynamic modeler 205, the initiating user might decide to share data associated with the particular M-Task with a recipient user of the dynamic modeler 205. As a particular example, the recipient user might be a supervisor of the initiating user, and the initiating user wishes to share a current status of the transaction associated with the M-Task; e.g., the M-Task might be to approve a quote for a particular service provided by a vendor associated with the transaction, and the initiating user wishes to share the quote with the supervisor. From a page of the dynamic smart interface 240 that is associated with the M-Task and that includes the data that the initiating user wishes to share, the initiating user can select an option to generate a notification C-Task. In response, the dynamic smart interface 240 presents a page that allows the initiating user to identify the particular recipient resource for the notification C-Task. In some implementations, the initiating user can also select a portion of the data of the M-Task to provide to the recipient resource in the notification C-Task; in some other implementations, all of the data of the M-Task, e.g., every field of the M-Task, is provided to the recipient resource.

When the initiating user submits the notification C-Task, the dynamic modeler can present the notification C-Task to the recipient user, e.g., using a central task hub 242 of the dynamic modeler 205. The central task hub 242 is discussed in more detail below. The recipient user can review the data associated with the notification C-Task. In some implementations, the recipient user can generate a chat C-Task in response to the notification C-Task, e.g., if the recipient user wants clarification about the data of the notification C-Task.

In the preceding example, the initiating resource and the recipient resource are both human users of the dynamic modelling system 200, but generally the initiating resource and the recipient resource of a notification C-Task can be any resource of the dynamic modelling system 200, e.g., an IoT device. As a particular example, a vehicle which is fitted with an IoT device can trigger a notification C-Task notifying the driver of the vehicle of low tire pressure.

A decision C-Task can be triggered by an M-Task to present a decision to a resource, e.g., to accept or deny a request or to negotiate a particular field of the M-Task with another resource of the dynamic modeler 205. That is, an initiating resource assigned to a particular M-Task can generate a decision C-Task to send to a recipient resource for the recipient resource to make a decision about one or more particular fields of the particular M-Task.

For example, from a page of the dynamic smart interface 240 corresponding to a particular M-Task assigned to an initiating user of the dynamic modeler 205, the initiating user can select an option to generate a decision C-Task. As a particular example, the M-Task might be to approve a quote for a service provided by a vendor resource of the dynamic modeler 205. The initiating user might not wish to approve the quote because the price is too high, and so decides to generate a decision C-Task for the vendor resource with a counter-offer. The dynamic smart interface 240 presents a page that lists each of the fields of the M-Task. The initiating resource can select one or more fields and submit a proposed response for the selected fields. For example, the initiating user can select a field corresponding to the price of the service, and submit a new price that is lower than the price that was proposed by the vendor resource. The initiating resource can also provide an identification for the recipient resource of the decision C-Task, i.e., the vendor resource.

When the initiating resource submits the decision C-Task, the dynamic modeler can present the decision C-Task to the vendor resource, e.g., using the central task hub 242. The vendor resource can then review the proposed responses provided by the initiating resource. In some implementations, the vendor resource is presented all fields of the corresponding M-Task, including those fields that were not selected by the initiating resource and about which the vendor resource does not need to make a decision. In some other implementations, the vendor resource is only presented the fields with proposed responses about which the vendor resource must make a decision.

For each proposed response corresponding to a different field of the M-Task, the vendor resource can either accept the proposed response, reject the proposed response, or revise the proposed response. In some implementations, if the vendor resource accepts a particular proposed response, then the proposed response can be automatically submitted to the M-Task of the initiating user. In some implementations, if the vendor resource rejects a particular proposed response, then the corresponding M-Task or the corresponding transaction can be cancelled, paused, escalated, or replaced. In some implementations, if the vendor resource revises a particular proposed response, e.g., submits a price that is higher than the price proposed by the initiating resource but lower than the original price proposed by the vendor resource, then a decision C-Task can be generated for the initiating resource to, in turn, either accept, reject, or revise the revised proposed response.

In some implementations, the initiating resource can receive a notification C-Task, automatically generated by the dynamic modeler 205, alerting the initiating resource that the decision C-Task has been completed, and presenting data characterizing whether each proposed response was accepted, rejected, or revised.

In the preceding example, the initiating resource is a human user of the dynamic modelling system 200, but generally the initiating resource of a collection C-Task can be any resource of the dynamic modelling system 200, e.g., an IoT device.

A collection C-Task can be triggered by an M-Task to collect one or more fields of the M-Task from a resource of the dynamic modeler. That is, an initiating resource can generate a collection C-Task to send to a recipient resource for the recipient resource to provide a response for one or more fields of an M-Task that is assigned to the initiating user. In some implementations, a collection C-Task can also be generated automatically by the rule monitor 260.

For example, from a page of the dynamic smart interface 240 corresponding to a particular M-Task assigned to an initiating user of the dynamic modeler 205, the initiating user can select an option to generate a collection C-Task. In response, the dynamic smart interface 240 presents a page that lists each of the fields of the particular M-Task for which the initiating user must provide responses. The initiating user can select one or more of the fields, and provide an identification for a recipient user to whom the collection C-Task should be assigned. The dynamic modeler 205 can then present the collection C-Task to the recipient user, e.g., using the central task hub 242. The collection C-Task presented to the recipient user includes only those fields that were selected by the initiating user; that is, the collection C-Task presented to the recipient user does not include any other fields of the parent M-Task that the initiating user did not select. In some implementations, the recipient user is also presented with some or all of the contextual data associated with the parent M-Task to provide context for the presented fields. The recipient user can provide responses for the presented fields, and submit the collection C-Task. The dynamic modeler 205 can then present, e.g., using the dynamic smart interface, the completed C-Task to the initiating user to verify the responses of the recipient user.

In some cases, the initiating user might decide to change one or more of the responses provided by the recipient user. For example, the initiating user might notice an error, or disagree with a decision made by the recipient user. In these cases, the initiating user can select the fields that are to be changed, and provide an updated response for each selected field. In some implementations, the dynamic smart interface 240 can provide indications to the initiating user of tracked changes to the fields. This allows the initiating user to easily track what changes have been made, and can provide an audit trail of what changes were made and by whom for later reference. For example, the dynamic smart interface 240 can include, next to each field in the collection C-Task, i) a timestamp corresponding to the time at which the field was most recently updated and ii) an identification of the resource of the dynamic modeler 205 that most recently updated the field. As another example, the dynamic smart interface 240 can provide an option for the initiating user to see a side-by-side comparison of the responses submitted by the recipient user and the updated responses submitted by the initiating user.

After the initiating user submits the updated responses to the fields of the collection C-Task, the rule monitor 260 can determine that there is a discrepancy between the data submitted by initiating user and the data submitted to the initiating user by the recipient user; that is, the rule monitor 260 can detect that the initiating user updated the data after the recipient user submitted the collection C-Task. In some cases, the rule monitor 260 can automatically send a notification to the recipient user that the data has been changed by the initiating user. In some other cases, the rule monitor 260 can prompt the initiating user, e.g., by sending a notification to the initiating user, to suggest that the initiating user notify the recipient user that the data has been changed. In some cases, the initiating user can notify the recipient user by sending a notification C-Task to the recipient user.

The recipient user can receive the notification, either from the initiating user or from the rule monitor, and view the changes to submissions of the fields of collection C-Task. For example, the notification can include a side-by-side comparison of the responses submitted by the recipient user and the updated responses submitted by the initiating user. In some cases, the recipient user can either approve or reject the changes made by the initiating user. In some cases, the recipient user can chat with the initiating user about the changes, e.g., by generating a chat C-Task. If the changes are rejected by the recipient user, then the dynamic modeler 205 can determine appropriate next steps, e.g., escalating the matter by generating a decision C-Task for a supervisor of the recipient resource or the initiating resource.

In the preceding example, the initiating resource and the recipient resource are both human users of the dynamic modelling system 200, but generally the initiating resource and the recipient resource of a collection C-Task can be any resource of the dynamic modelling system 200, e.g., an IoT device.

As mentioned above, the initiating resource for a particular C-Task could be the rule monitor 260 of the dynamic modeler 205. That is, the rule monitor 260 can automatically trigger the generation of a C-Task in response to the completion of a particular task by another resource of the dynamic modeler 205, e.g., after detecting a discrepancy in the contextual data of a particular task. The rule monitor 260 can generate the C-Task using the contextual data of an M-Task, a C-Task corresponding to an M-Task, or both. The rule monitor 260 can automatically determine the appropriate recipient resource of the generated C-Task, and the dynamic modeler 205 can send data characterizing the generated C-Task to the determined recipient resource. Upon receiving a response back from the recipient resource that includes data characterizing the completed C-Task, the rule monitor 260 can process the response to automatically validate the contextual data of the completed C-Task. If the rule monitor detects a discrepancy in the data of the completed C-Task, the rule monitor can generate another C-Task to reconcile the discrepancy.

Each task in the Central Task Hub 242 can be represented by an interactable graphical element with which a user can interact to open a task page for the particular task. The Central Task Hub can also include other interactable graphical elements that are not related to particular tasks to which the user has been assigned. The listed tasks can be specific according to the role and credentials of the user, and can be stored in a table or database in, or accessible by, the dynamic modeler 205.

Thus, rendering the home page can include submitting a query to the database, receiving the list of tasks and/or other interactable graphical elements corresponding to the user from the database in response to the query, and rendering information about each of the received tasks and/or interactable graphical elements on the home page. For example, the rendering of a task can include a transaction name, a task name, a due date, etc. The elements on the home page can be ordered, e.g., by priority or age.

From the home page, the user may select one of the listed elements to open. For example, the user can select an element with a single dynamic first event; that is, the user opens the element with a single interaction with the user device, e.g., with a single mouse click. The single dynamic first event can cause the dynamic modeler 205 to generate a particular output according to the single interaction with the user device. To do so, the user device 210 can then send a dynamic single request input 212 with contextual dynamic data to a dynamic modeler 205. The dynamic single request input 212 can define the dynamic user interface interaction that prompted the event, e.g., by specifying the particular task that the user selected.

For example, if the selected graphical element characterizes a task assigned to the user, the contextual dynamic data can identify the user, the particular task that the user selected, and a transaction that the task is a part of. As a particular example, the contextual dynamic data can include a user profile, a transaction profile, a task profile, and an output model profile. The user profile can include data fields that characterize the user. As a particular example, each user profile can inherit from a base user class, with fields such as "name," "role," "credentials," etc. The transaction profile can include data fields that characterize the transaction, e.g., a transaction type and a list of associated resources. The task profile can include data fields that characterize the task, e.g., an assigned user, the corresponding transaction, etc. The output model profile can include data characterizing the particular configuration of the dynamic modeler 205, e.g., as established by the organization of the user.

The dynamic modeler 205 can receive the dynamic single request input 212 and use it in combination with additional contextual information to generate an output model 222 that characterizes the next page that is to be presented to the user on the user device 210. The dynamic modeler 205 can using intelligent resource interaction to generate the output model 222. That is, the dynamic modeler 205 can use historical data to learn how to generate the output model 222, e.g., using one or more machine learning models. For example, if the output model 222 corresponds to a task assigned to the user of the user device 210 for selecting resources to use during a transaction, then the dynamic modeler 205 can use IRI along with the contextual information of the dynamic single request input 212 and historical data to identify resources to present as suggestions.

The dynamic modeler 205 can include a dynamic smart interface 240 that includes the Central Task Hub 242, a dynamic report viewer 244, and a C-Task generator 246.

As previously stated, one or more of the interactable graphical elements listed on the Central Task hub 242 can correspond to non-actionable items that the user can view. For example, a non-actionable interactable graphical element can identify a document that can be viewed by the user. As a particular example, a user that has completed a previous task in a given transaction may wish to see a report of the progress of the given transaction, or the output of a particular step in the given transaction. In this case, the list of interactable graphical elements presented to the user on the home page can include one or more elements that correspond to documents that the user may wish to review. When the user selects one such element, the dynamic report viewer 244 can generate the report for display to the user, including the generated report in the output model 222. The generated reports can be standardized; that is, each report generated by the dynamic modeler 205 can be generated according to a template and populated according to the contextual dynamic data of the dynamic single request input 212.

As another example, a user that is a part of a transaction may wish to generate "document outputs," i.e., documents that the user can export from the platform. That is, the user can select a document that is presented on the home page as a non-actionable graphical element, and when the document is rendered for the user, select a method of exporting the document from the platform; e.g., the user may wish to export an invoice for mailing to a client.

As another example, a non-actionable interactable graphical element can characterize an operation for performing data reconciliation. For example, the user can request certain data related to a particular task or a particular transaction, and the dynamic modelling system can extract accurate and reliable data from a database that stores data related to tasks and transactions, and model and render a page that presents this data to the user. On the backend, the dynamic modeler 205 can perform automatic data validation and reconciliation to ensure the quality of the data.

These non-actionable elements can be associated with a particular transaction, but they are not a part of the sequenced process of tasks for the particular transaction; e.g., these non-actionable elements can be optional for the user to review. When the user selects such a non-actionable element, the user device 210 can again send a dynamic single request input 212 that defines the particular dynamic user interface interaction that caused the event to be triggered; for example, the dynamic single request input 212 can define the particular report document that the user is requesting the dynamic report viewer 244 to generate. Upon receiving the dynamic single request input 212, the dynamic modeler 205 can dynamically model and render the requested report document, with no controls for the user to interact with.

The C-Task generator 246 can be used by the user of the user device 210 to generate a C-Task for a particular M-Task that is assigned to the user and listed in the Central Task Hub 242. The process for generating a C-Task is discussed in more detail below in reference to FIG. 5.

The dynamic modeler 205 can include a dynamic process manager 250 that manages a rule monitor 260, a smart task generator 270, and a smart contract system 280. The dynamic modeler 205 can determine which received dynamic single request inputs 212 require interaction with one or more of the rule monitor 260, the smart task generator 270, or the smart contract system 280, and can manage that interaction, e.g., by generating one or more tasks to send respective queries to the required subsystems.

The rule monitor 260, for example, can detect discrepancies in M-Tasks according to rules of the dynamic modeler 205. In some cases, the rule monitor 260 can present one or more rule options to the user on the user device 210. This process is discussed in more detail below in reference to FIG. 5. When a user completes an M-Task, the rule monitor 260 can also determine a next task in the transaction of the completed M-Task and determine a next resources of the dynamic modeler 205 to whom to assign the next task.

In some implementations, the dynamic report viewer 244 can also generate reconciliation reports for the user that presents data characterizing discrepancies detected by the rule monitor 260. For example, when the rule monitor 260 detects discrepancies in the data corresponding to a particular task, the rule monitor 260 can provide data characterizing the discrepancies to the dynamic report viewer 244, which can generate a reconciliation report emphasizing the data discrepancies. As a particular example, the reconciliation report can highlight, e.g., with a particular color, the data of the task that has a discrepancy according to the rule monitor 260.

The smart task generator 270 can generate a model for the task page to include in the output model 222. For example, the smart task generator 270 can determine, according to the output model profile of the dynamic modeler 205 and the contextual dynamic data of the dynamic single request input 212, what data to include in the output model 222. The selected fields will be presented to the user on the task page to complete the M-Task.

The smart contract system 280 can manage one or more smart contracts between different entities or resources of the dynamic modeler 205. A smart contract can be a set of terms and conditions that are encoded in a distributed ledger that authenticates and permanently records the smart contract. In some cases, when the conditions of the smart contract are met, the terms of the smart contract are automatically enforced using the distributed ledger. In some cases, payments related to a smart contract can be made using a cryptocurrency; in some other cases, payments can be made using a traditional currency. The smart contract system 280 can include a secure repository of transaction information that cannot be modified after storage. For example, a resource of the dynamic modeler 205 can access the terms and conditions of a smart contract encoded in the smart contract system 280 to determine if the terms and conditions have been satisfied; the smart contract system 280 can thereby provide a single source of the ground-truth agreement between multiple different parties so that there is no confusion or ambiguity about the agreement.

When a model is saved to a smart contract, the model can be concurrently saved in one or more databases accessible by the resources of the model. Then, when the smart contract is queried, one or more data fields of the model can be queried from the version of the model that is saved in a particular database, and compared against the ground-truth model that is saved to the smart contract. In some implementations, only certain components of the model can be saved to a smart contract. For example, some steps of a transaction of the model can be saved to the smart contract while other steps of the transaction of the model are not saved to the smart contract.

The dynamic modeler 205 can provide the generated output model 222 to a render structure 240 in the dynamic modeler 205, which can use the output model 222 to generate render data 292 that can be used by the user device 210 to render the modelled page on a graphical user interface of the user device 210, e.g., code defining the layout and content of a user interface that is interpreted by an application on the user device to render the page.

In some implementations, the render structure 240 sends the render data 292 to a virtual machine associated with the user device 210 and that is separate from the user device 210. In these implementations, the virtual machine renders the pages generated by the dynamic modeler 205, and sends image data for presentation on a remote client of the user device 210. This can be helpful when the client of the user device 210 is a thin client and has limited capability of rendering pages. In these implementations, the virtual machine associated with the user device 210 can include the memory 211 of the user device 210, as described above.

In some cases, the current page of the user is a task page for completing a particular M-Task, and the user may select to save and submit the completed M-Task. For example, the user can submit a single dynamic final event to complete the current task and return the user to the Central Task Hub 242 with a single interaction with the user device. That is, the user can complete the task and write the data of the completed task to one or more databases using a single interaction with the user device 210. The Dynamic Smart Interface 240 can use contextual dynamic data, e.g., contextual dynamic data included in the single dynamic final event, to determine an updated list of tasks assigned to the user and non-actionable elements available to the user based on the previous user action, and generate an output model 222 of the Central Task Hub 242 to present to the user on the user device 210. In some other cases, the current page of the user is a task page corresponding to a particular M-Task, and the user may select to open a report that is associated with the particular M-Task. The dynamic report viewer 244 can then generate the report according to the user, task, transaction, and output model profiles.

In some implementations, after the user opens a particular task from the Central Task Hub 242 and the dynamic modelling system 200 renders the selected task page on the user device 210, the user may determine that the task needs further attention, e.g., that the task need to be escalated. That is, the user determines that another user, e.g., a supervisor, should review the task or respond to particular commands in the task before the transaction continues to the next task in the sequenced process. For example, a response to a previous task in the transaction might include information that requires supervisor approval or verification. As a particular example, a first task in the transaction can be for a contractor to provide a quote to a company, and a second task in the transaction can be for an employee of the company to approve the quote. The employee may have a maximum amount that he or she is permitted to accept without supervisor approval. If the provided quote surpasses this maximum amount, then the employee can escalate the task so that that task is assigned to the supervisor for approval. In these cases, the user can generate a new C-Task using the C-Task generator 246 indicating that the task is to be escalated and selecting one or more particular fields of the M-Task that should be reviewed. In this case, the dynamic single request input 212 can include contextual dynamic data characterizing the generated C-Task, the user, and the transaction. In response to this input, the dynamic modeler 205 can use the contextual dynamic data to determine a next resource to assign the new C-Task, e.g., a supervisory user, and assign the new C-Task to the next resource.

In some other cases, after the user opens a particular task from the home page and the dynamic modelling system 200 renders the selected task page on the user device 210, the user may wish to "snooze" the particular task. That is, the user does not want to complete the task, but rather remove the task from the list of tasks assigned to the user for a specified amount of time, e.g., a day, a week, or a month. In these cases, the user can submit an input to the dynamic modeler 205 indicating that the task is to be snoozed; the input can include contextual dynamic data characterizing the task, the user, and the transaction. In response to this input, the dynamic process manager 250 can use the contextual dynamic data to remove the task from the list of tasks assigned to the user, and then add the task back to the list after the specified amount of time has passed.

Figure 3:
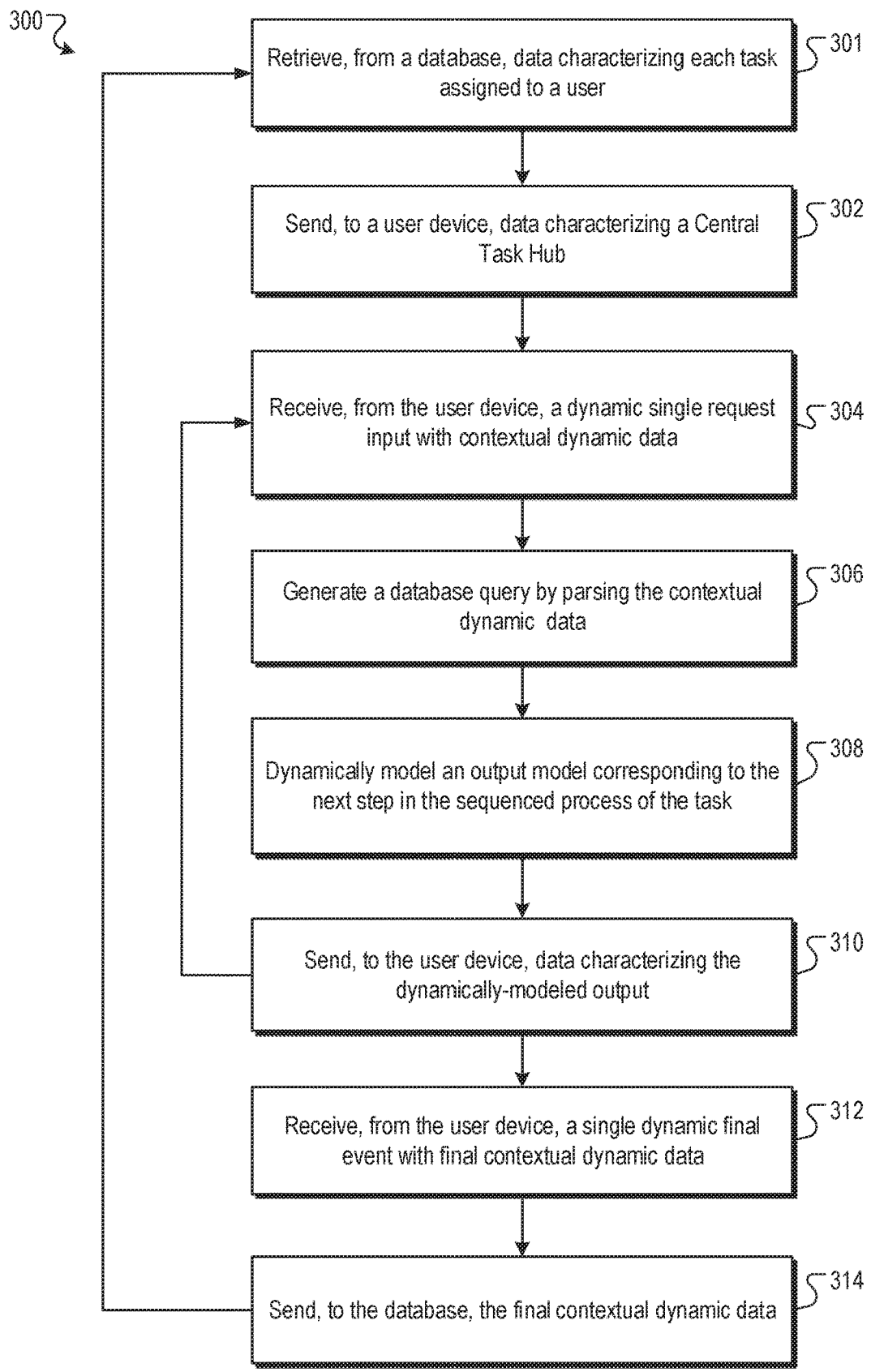
FIG. 3 is a flow diagram of an example process for responding to a dynamic event.

FIG. 3 is a flow diagram of an example process 300 for responding to a dynamic event. For convenience, the process 300 will be described as being performed by a system of one or more computers located in one or more locations. For example, a dynamic modeler, e.g., the dynamic modeler 130 depicted in FIG. 1 or the dynamic modeler 205 depicted in FIG. 2, appropriately programmed in accordance with this specification, can perform the process 300.

The system retrieves, from one or more databases, data characterizing each task that is assigned to a particular user (step 301). The retrieved tasks can include a task from each transaction in which the user is a participant and for which the user is assigned.

The system sends, to a user device, data characterizing a Central Task Hub (step 302). The Central Task Hub presents to the user the list of tasks assigned to the user. The Central Task Hub allows the user to select, with a single screen interaction, a task that the user wishes to complete. The Central Task Hub can be generated by a dynamic smart interface of the dynamic modeler, and the generation may be in response to a user authentication event; e.g., the user may have provided login credentials that the system validated in a previous time step.

The system receives, from the user device, a dynamic single request input with associated contextual dynamic data (step 304). The dynamic single request input is received in response to the user interacting with the Central Task Hub. The dynamic single request input can be one of multiple different dynamic interaction types, and can be received from one of multiple different modes, e.g., via a voice command, an API command, or a screen interaction such as a tap or a click. For example, the dynamic single request input can be a single dynamic first event, where the user selects a particular task of a transaction from the Central Task Hub. Here, the contextual dynamic data includes i) a profile of the user, ii) a profile of the selected transaction, iii) a profile of the selected task, and iv) an output model profile of the dynamic modeler.

The system generates a database query by parsing the contextual dynamic data of the received dynamic single request input (306). The database query is generated to retrieve, from one or more databases, a next step in a pre-defined sequenced process associated with the selected task. The next step of the task can include one or more controls that are to be presented to the user, e.g., prompts for the user to input information. In some cases, the first step of the task will also include a set of available options for the user to respond to each of the particular prompts. The available prompts to be provided are dependent upon the context and, in particular, to the resource and task.

The system dynamically models an output model corresponding to the retrieved next step of the sequenced process of the task according to the results of the query (step 308). The output model includes all controls for the next step in the sequenced process of the task. The system can generate the output model dynamically by automatically interpreting the content of the dynamic single request input, including the contextual dynamic data. This process is described in more detail below in reference to FIG. 4.

The system sends, to the user device, data characterizing the dynamically-modeled output. (step 310). The data is used by the user device to render the page of the output model on a display of the user device.

In some implementations, the system can repeat steps 304-310 for each step in the sequenced process of the selected task. That is, for each subsequent step in the task, the system can receive, from the user device, a dynamic single request input with contextual dynamic data (step 304). Here, the contextual dynamic data includes the user's responses to the prompts presented in the previous step in the sequenced process of the task. The system can generate a database query according to the received contextual dynamic data (step 306). Again, the query is generated to retrieve the subsequent step in the sequenced process. In some cases, the subsequent step will vary according to the user's responses to prompts in previous steps of the sequenced process of the task. For example, the set of available options for a particular prompt can be limited according to previous responses. The system can then model the graphical page of the retrieved subsequent step, and send data characterizing the dynamically-modeled page to the user device (steps 308 and 310).

In some other implementations, the generated dynamic model includes respective information for each of the steps in the sequenced process of the task. In these implementations, after receiving data characterizing the generated dynamic model (step 310), the user device can use the generated dynamic model to collect the user's responses to the prompts of each step of the task, use the responses of each step to render a new page that corresponds to the subsequent step in the sequenced process of the task, and present the new page to the user. In other words, the user device does not send a new dynamic single request input to the system and wait for data in response for every step of the sequenced process. This process is described in more detail below in reference to FIG. 4.

In some implementations, the data characterizing the dynamically-modelled page can include one or more listeners attached to a field of the dynamically-modelled page. These listeners can be triggered when a user interacts with the field, e.g., selecting an option or inputting text. The triggers can automatically send data entered into the field to the database, without the user actively saving the progress on the dynamically-modeled page. As a particular example, the field may be a selection of a particular airline seat for an upcoming flight; the listener can automatically receive the data that the user submits to this field and send it to the database, so that the database can reflect the fact that the seat has been reserved and cannot be reserved by another user. Thus, a second user cannot reserve the seat after the user has selected the seat but before the user has completed the task or saved the progress of the task.

The system receives, from the user device, a single dynamic final event with final contextual dynamic data (step 312). In some cases, the single dynamic final event is a single-save event, where the user selects to save the progress of the current task with a single interaction. In these cases, the single-save event can be received in response to the user selecting, with a single screen interaction, to save the results of the sequenced process, e.g., by selecting a "Save" button. In some other cases, the single dynamic final event is a cancel event, where the user cancels the progress made on the task so far and returns the task to the list of tasks assigned to the user without any updates to the task, e.g., by selecting an "Exit" button.

When the single dynamic final event is a single-save event, the final contextual dynamic data can include the user's responses to the prompts presented in the most recent step of the sequenced process. In some cases, the user completed the selected task before sending the single-save event. That is, the most recent step of the sequenced process of the task was the final step in the sequenced process of the task, and the user responded to every prompt in the final step. In some other cases, the user did not complete the selected task before sending the single-save event. That is, the most recent step of the sequenced process of the task was not the final step in the sequenced process of the task, or the user did not respond to every prompt in the most recent step.

The system sends, to the database, the final contextual dynamic data (step 314).

In the cases where the final event was a cancel event, the contextual dynamic data can include the progress of the particular task before the user started on the task, in step 304.

In the cases where the final event was a single-save event and the user completed the selected task, the database can use the final contextual dynamic data to determine i) the next task in the transaction, and ii) the next resource to which the next task should be assigned. In some cases, the final contextual dynamic data will specifically identify the next resource; that is, the user will have selected the next resource to assign the next task in the transaction. In some other cases, the next resource can be determined according to the transaction profile, the task profile, and/or the output model profile of the dynamic modeler.

In the cases where the single dynamic final event was a single-save event and the user did not complete the selected task, the database can determine that the selected task should still be assigned to the user, and can save the user's progress through the selected task.

In some implementations, a background process can run on the data stored in the database that processes data that has been added to the database. For example, if the system sends contextual dynamic data of a task to the database that includes data that characterizes a particular transaction, then the background process can process that data and produce an output that is added to the transaction profile of the particular transaction. As a particular example, a user can complete a task that is an approval for the transaction to continue, so the contextual dynamic data that the system sends to the database after the supervising user completed the task includes data characterizing whether the transaction is approved or denied. The background process can process this contextual dynamic data, e.g., to determine the decision, and modify the transaction profile of the particular transaction, e.g., by writing a field to the transaction profile that characterizes the status of the transaction. In some such implementations, the background process can be triggered when new data is sent to the database. In other such implementations, the background process can be triggered when a query for the processed data is submitted to the database; for example, the background process can wait to process the contextual dynamic data characterizing the status of the transaction until the database receives a query for a report on the status of the transaction.

The system can further repeat the entire process 300, starting from step 301. That is, the system can automatically return the user to return to the Central Task Hub that presents a list of tasks assigned to the user following a single save event to a dynamically rendered page. This list can be updated to account for both the completion of a task and the addition of any newly assigned tasks.

Figure 4:
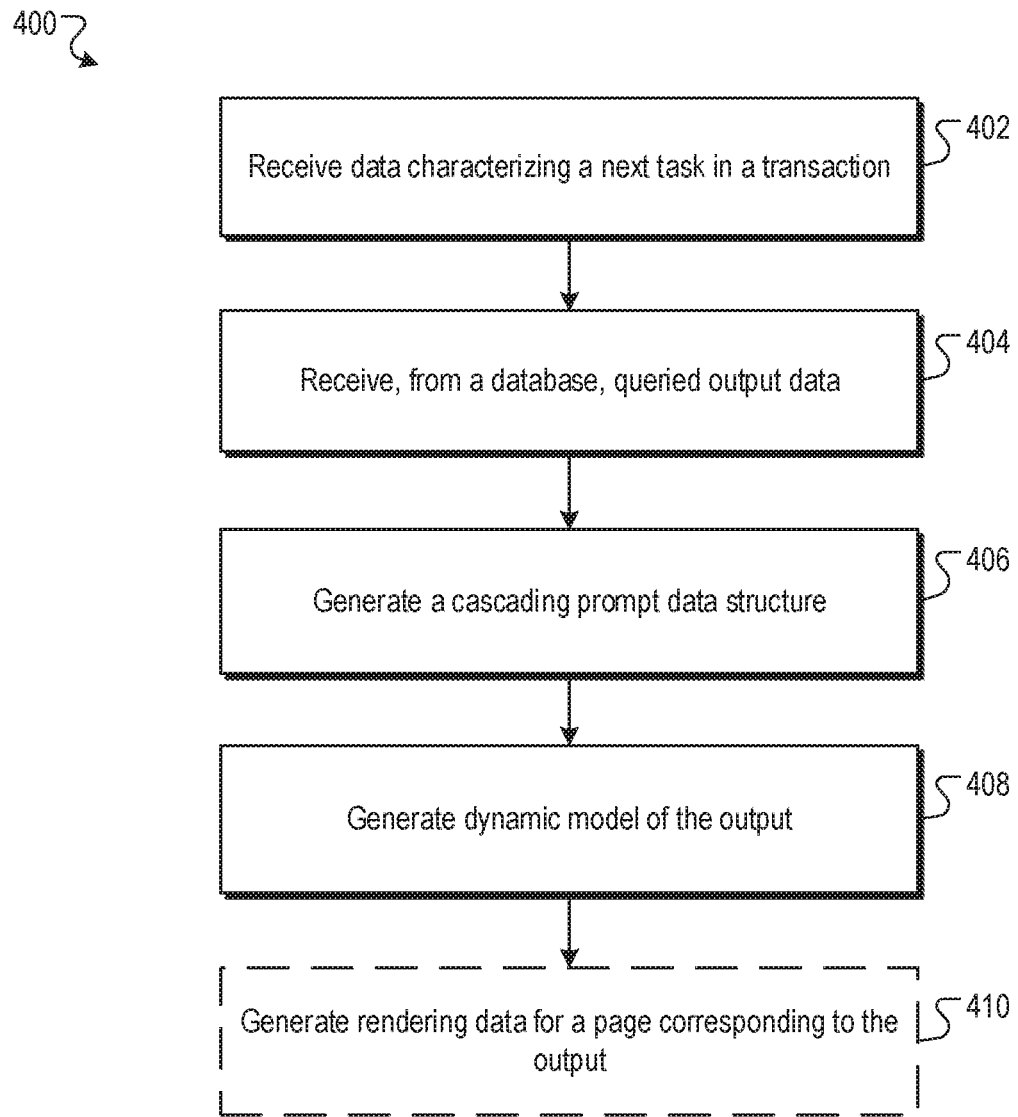
FIG. 4 is a flow diagram of an example process for dynamically modeling an output.

FIG. 4 is a flow diagram of an example process 400 for dynamically modeling an output. The output is to be presented to a resource to complete a task in a given sequenced process that defines a transaction. For convenience, the process 400 will be described as being performed by a system of one or more computers located in one or more locations. For example, a dynamic modeler, e.g., the dynamic modeler 130 depicted in FIG. 1 or the dynamic modeler 205 depicted in FIG. 2, appropriately programmed in accordance with this specification, can perform the process 400.

The system receives data characterizing a next step in the transaction (step 402). The transaction includes a sequence of tasks, where each task has a precise configuration given the outputs of the previous tasks in the sequence. In some cases, the sequence of tasks itself can be dynamic based on the outputs of the previous tasks in the sequence; that is, a next task after a particular task in the sequence can depend on the output of the particular task, so that for some outputs a first resource is assigned a first task as the next task and for some other outputs a second resource is assigned a second task as the next task. In some other cases, the sequence of tasks can be predetermined according to a type of the transaction; e.g., some transactions can always have the same tasks executed in the same order. The received data can include a set of possible controls to present to a resource that is a user of the dynamic modeler on a page corresponding to the task to complete the task.

The system receives, from a database, queried output data (step 404). The output data can include a set of possible responses to each of the prompts for the given task. The output data can also include responses to previous tasks in the sequenced process.

The system generates a cascading prompt data structure from the queried output data (step 406). The cascading prompt data structure can define, for each particular sequence of responses provided by the resource to a sequence of prompts, a set of subsequent prompts and options to be provided for the resource to respond to the subsequent prompts. That is, if the resource responds to a first prompt in a particular way, then the subsequent prompts and options presented to the resource can be different than if the resource had responded to the first prompt in a different way. In this specification, the cascading prompt data structure is also referred to as "dynamic cascading filters," because each response to a particular prompt earlier in the sequence can dynamically filter out possible prompts and options later in the sequence.

As a particular example, the system can dynamically generate a tree of prompt options using the queried output data. Each level of the tree can correspond to a given prompt, and each node at the level can define every option that should be presented for the given prompt given a particular set of responses to previous prompts. Every option defined by a particular node can have a corresponding edge connecting the node with a child node at the level directly below the current level in the tree. If the resource selects a particular option, then the system should traverse the edge corresponding to the option down to the corresponding child node, and use the child node to determine the options to present for the next prompt. Thus, the system can traverse the tree to iteratively determine options based on previous selections. Each of the prompts and available options can also depend upon the resource and the particular task.

The system generates the dynamic model of the output (step 408). In particular, the system uses the cascading prompt data structure to determine the model that will be used to provide the dynamic options available to the resource for each prompt. For example, the system can use a dynamic process manager, e.g., the dynamic process manager 250 depicted in FIG. 2, to generate the dynamic model.

Optionally, the system can generate rendering data of a page corresponding to the output using the dynamic model of the output (step 410). The rendering data can include data that will be used by a user device to render the page on a display of the user device. For example, the system can use a render structure, e.g., the render structure 290 depicted in FIG. 2, to generate the rendering data.

In some implementations, the system uses a user-interface template to generate rendering data for a page corresponding to a dynamically-generated output. For example, the page can always include a single button that the user can interact with to save the progress of the given task and return to the home page. The button can always be located in the same place on the rendered screen. As another example, the page can always include a region that identifies the task, e.g., a region at the top of the page that includes a task name, a transaction name, a due date, etc. The region can always have the same format, color, etc.

That is, the content of the output is dynamically determined according to the particular task, transaction, and resource, but the appearance and structure of a page corresponding to the output can be standardized. This can help make the dynamically-generated pages easier to understand for the user, because the user is familiar with the layout across multiple different tasks even if the content changes.

The system can use the cascading prompt data structure to generate logic that the user device can use to navigate the cascading options as the user responds to prompts. For example, the system can generate listeners on the screen that identify what option was selected when a user responds to a prompt. The system can also generate rendering data for each possible prompt to be displayed to the user. Then, the user device can use the data received from a listener to determine the next prompt to be displayed, and then use the generated rendering data to render the next prompt on the display. Thus, the user device can iteratively use the rendering data to guide the user through the completion of the task.

The rendering data can also be generated according to the particular task, transaction, user, and/or output model profile of the dynamic modeler. For example, a task can have a type that partially determines the rendering data. As a particular example, a first task might be to approve the output of a preceding task in the sequenced process of tasks, where the user must input a binary decision of whether the output is approved. A second task might be require the user to type a text response to a prompt. Each of these task types might have particular rendering data that is different from other task types.

Figure 5:
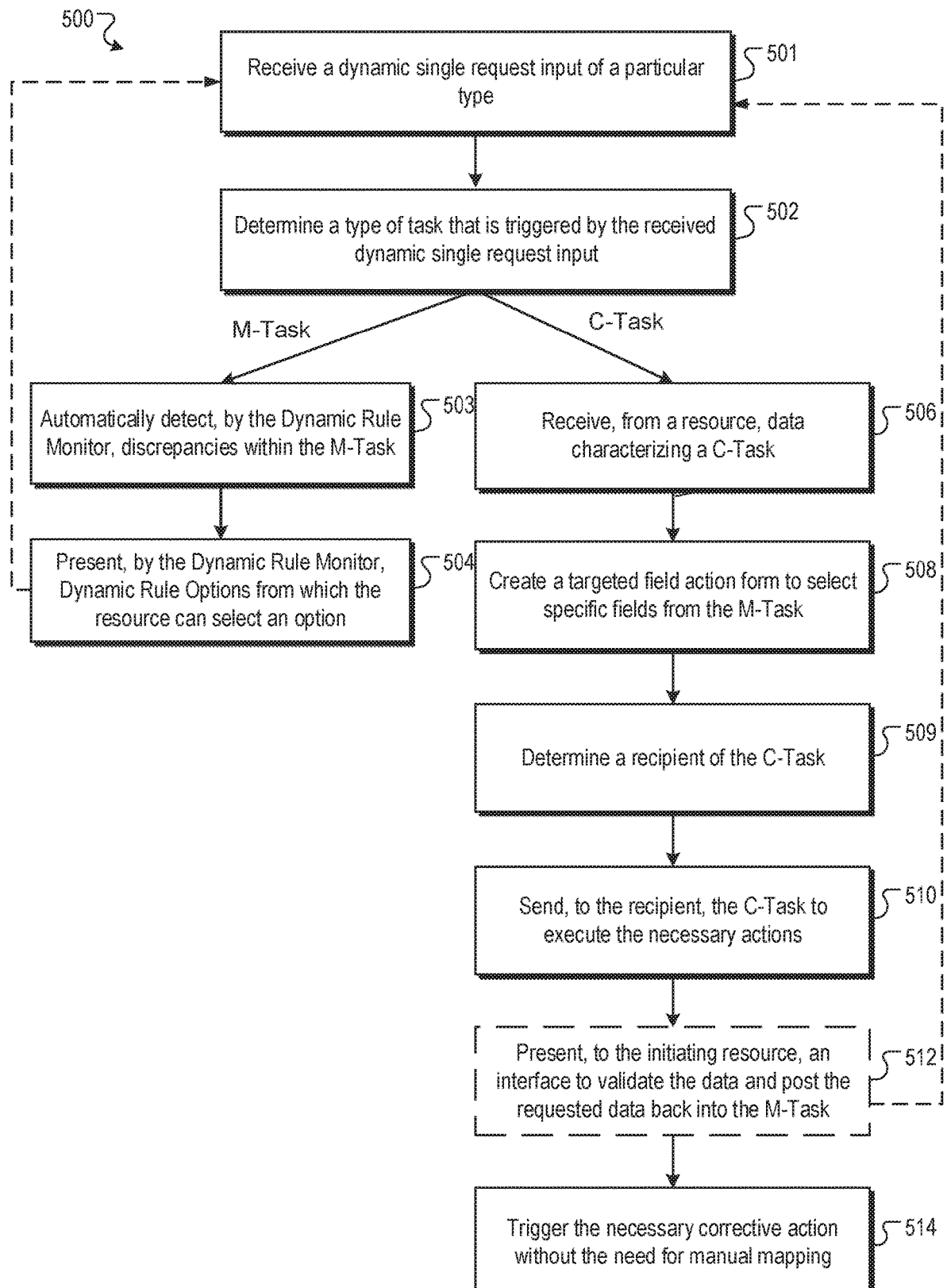
FIG. 5 is a flow diagram of another example process for dynamically modeling an output.

FIG. 5 is a flow diagram of an example process 500 for validating data of the dynamic modeler. For convenience, the process 500 will be described as being performed by a system of one or more computers located in one or more locations. For example, a dynamic modeler, e.g., the dynamic modeler 130 depicted in FIG. 1 or the dynamic modeler 205 depicted in FIG. 2, appropriately programmed in accordance with this specification, can perform the process 500.

The system receives a dynamic single request input having a particular type (step 501). The dynamic single request input can be received from a resource associated with the dynamic modeler, e.g., a user of the dynamic modeler or an IoT or non-IoT device.

In response to the received dynamic single request input, the system determines what type of task is triggered by the received dynamic single request input (step 502). In particular, the system can determine whether the dynamic single request input was triggered by the completion of a main task ("M-Task") by a resource of the dynamic modeler (branch 503) or whether the dynamic single request input was triggered by a resource requesting the creation of a communicator task ("C-Task") (branch 506).

In response to determining that the dynamic single request input was triggered by the completion of an M-Task, the system automatically detects discrepancies within the M-Task using a Dynamic Rule Monitor (step 503). The Dynamic Rule Monitor can process the received dynamic single request input, including processing the resource's responses to the fields of the M-Task, in order to determine whether the M-Task violates one or more rules of the dynamic rule monitor. The rules can be determined from the output model profile of the dynamic modeler.

After automatically detecting discrepancies within the M-Task, the system presents one or more dynamic rule options to a resource from which the resource can select an option (step 504). For example, the dynamic rule options can include "Reject," "Approve," "Escalate," "Snooze," and "Re-Assign." The system can determine the dynamic rule options from a set of standard dynamic rule options, and/or according to the particular resource, task, and/or transaction profiles of the current M-Task, and/or the output model profile of the current dynamic modeler.

In some cases, the resource's response to the Dynamic Rule Options might be to trigger a C-Task for another resource. In these cases, the system can re-start the process 500 at step 501.

In response to determining that the dynamic single request input triggers generation of a C-Task, the system receives, from the resource, data characterizing the C-Task (step 506). In some cases, the resource generates a C-Task in response to a discrepancy that the resource identifies, and requires information from one or more other resources of the dynamic modeler in order to rectify the discrepancy. In some other cases, the resource simply does not have all information the resource needs to complete a task, and requests this information from other resources.

The resource can identify one or more fields in an M-Task to send to a recipient resource for input by the recipient resource. These fields of the M-Task are to be completed by the recipient resource and are included in the C-Task.

The system creates a targeted field action form to select specific fields from the M-Task (step 508). This targeted field action form includes all fields in the M-Task that the resource selected to include in the C-Task.

The system determines the resource that is the proper recipient of the generated C-Task (step 509). In some cases, the recipient resource can be a second user that has the credentials for responding to the targeted field action form. In some other cases, the recipient resource can be an Internet-of-Things (IoT) device that has data for responding to the targeted field action form.

The system sends, to the recipient resource, the C-Task to execute the necessary actions (step 510). The recipient resource can then submit responses to the targeted field action form of the C-Task.

Optionally, the system presents, to the initiating resource, an interface to validate the data submitted by the recipient resource (step 512). In particular, the initiating resource can approve the data, and the data will be posted back into the M-Task; i.e., the responses given by the recipient resource to the selected fields of the M-Task will be submitted as the responses to that M-Task. The initiating resource can also reject the responses of the recipient, and either complete the selected fields of the M-Task him/herself, or generate another C-Task. That is, the resource can instruct the process 500 to begin again at step 501. In some cases, this step can be omitted, e.g., if the system itself can confirm the accuracy of the responses to the targeted field action form submitted by the recipient resource.

The system triggers the necessary corrective action without the need for manual mapping (step 514). That is, the system does not require a user to manually configure the data of the dynamic modeler to correct the discrepancy; the system can automatically do so according to the approved responses to the C-Task. Thus, the system can ensure data integrity.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Embodiments of the subject matter include computer systems, apparatus, and computer programs recorded on one or more computer storage devices, each configured to perform the actions of the described methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a dynamic modeler comprising a framework for application and user interface modeling for dynamic user interaction on a single platform by configuration only, wherein the dynamic modeler is configured to generate, for all applications, i) a single shared first event, ii) a single shared dynamic cascading filter, and iii) a single shared final event, powered by an application's context and based on a user event triggering a dynamic process manager to auto-generate next main tasks and communicator tasks and their correspondent resources, to provide set standardized collaboration on a single integrated-solution platform, wherein the dynamic modeler is configured to generate set standardized reporting, reconciliation, and output documents, and wherein the dynamic modeler is configured to provide the integrated-solution platform for IoT and non-IoT resources, wherein the dynamic modeler features include i) a dynamic smart interface, ii) dynamic interaction types, iii) the dynamic process manager, iv) contextual dynamic data, and v) a dynamic report viewer that provides set standardized reporting, reconciliation, and output documents, wherein the dynamic modeler having a single dynamic first event/single dynamic final event and intelligent resource interaction, combined with its shared standard transaction parameters including set or revised terms, a resource profile, and a transaction identifier, enables a constant creation of a single common model bound to a unique identifier of and for the model to be saved into a smart contract, wherein the unique identifier is selectively queried on demand by a resource to return, view or compare the set terms to be executed from the integrated-solution platform, wherein each transaction of dynamic modeler is driven by main tasks and supported by communicator tasks that allow users to collaborate within a main task, wherein the dynamic modeler is configured to provide single interactions that are common across application configurations and shared across the integrated-solution platform, wherein the dynamic modeler is configured to query contextual data that has been created by multiple resources across the integrated-solution platform, and wherein the dynamic modeler is configured to perform operations in response to the dynamic interaction types comprising: receiving a first dynamic input request with corresponding contextual inputs comprising data characterizing a single dynamic first event of the main task; generating, in response to the first dynamic input request, a dynamic smart interface responding to the contextual inputs; generating, in response to the first dynamic input request, a model comprising a single shared dynamic control load and dynamic data load responding to the contextual inputs; receiving a second dynamic input request comprising data characterizing a single dynamic final event of the main task; triggering, in response to the second dynamic input request, a dynamic process comprising a rule monitor, a smart task generator, and a smart contract; and presenting, to a user in response to the second dynamic input request, dynamic rule options comprising one or more of rejecting, approving, escalating, snoozing, or re-assigning the main task.

Embodiment 2 is the dynamic modeler of embodiment 1, wherein the contextual inputs comprise: a resource profile, a task profile, a transaction profile, and an output model profile.

Embodiment 3 is the dynamic modeler of embodiment 2, wherein the output model profile comprises a page name, one or more section names, one or more field names and computed fields, and a page sequence.

Embodiment 4 is the dynamic modeler of any one of embodiments 1-3, wherein the operations further comprise generating, in response to the second dynamic request input, a standard reconciliation report which automatically emphasizes any data field discrepancies detected by the rule monitor.

Embodiment 5 is the dynamic modeler of any one of embodiments 1-4, wherein the operations further comprise receiving, prior to the second dynamic input request, a C-input comprising data characterizing the main task and a communicator task associated with the main task, wherein the C-input is triggered by an initiating resource.

Embodiment 6 is the dynamic modeler of embodiment 5, wherein the initiating resource is the rule monitor of the dynamic modeler, and wherein the operations further comprise: automatically generating, by the rule monitor and using the data in the C-input, the communicator task; automatically determining, by the rule monitor, a recipient resource of the generated communicator task; sending, to the recipient resource, data characterizing the generated communicator task; receiving, from the recipient resource, data characterizing the communicator task, wherein the communicator task has been completed by the recipient resource; and automatically validating, by the rule monitor, one or more fields of the completed communicator task.

Embodiment 7 is the dynamic modeler of any one of embodiments 5-6, wherein the communicator task is a collection C-task, and wherein the operations further comprise: presenting, to the initiating resource in response to the C-input, an interface for selecting one or more fields of the main task; receiving data characterizing the one or more selected fields; in response to the receiving, generating a collection C-task from the data, comprising generating a targeted field action form comprising the selected fields; determining a recipient resource of the generated collection C-task; sending, to the recipient resource, data characterizing the generated collection C-task, comprising presenting the targeted field action form to the recipient resource; and receiving data characterizing completed fields of the new communicator task, the completed fields having been submitted by the recipient resource.

Embodiment 8 is the dynamic modeler of embodiment 7, wherein the operations further comprise: presenting, to the initiating resource, an interface to validate the completed fields; and posting data derived from the completed fields into the main task.

Embodiment 9 is the dynamic modeler of any one of embodiments 7-8, wherein the operations further comprise: receiving, data characterizing updated fields of the new communicator task, the updated fields having been submitted by the initiating resource in response to receiving the completed fields; automatically determining, by the rule monitor, a discrepancy between the completed fields and the updated fields; and sending data characterizing a notification of the discrepancy to the initiating resource, the recipient resource, or both.

Embodiment 10 is the dynamic modeler of any one of embodiments 5-9, wherein the communicator task is a decision C-task, and wherein the operations further comprise: receiving data characterizing one or more proposed responses corresponding to respective fields of the main task; in response to the receiving, generating a decision C-task from the data; determining a recipient resource of the generated decision C-task; sending, to the recipient resource, data characterizing the generated decision C-task, comprising presenting the proposed responses to the recipient resource; and receiving response data characterizing, for each proposed response, either i) an approval of the proposed response, ii) a rejection of the proposed response, or iii) a revision of the proposed response, the response data having been submitted by the recipient resource.

Embodiment 11 is the dynamic modeler of any one of embodiments 5-10, wherein the communicator task is a notification C-task, and wherein the operations further comprise: receiving data characterizing one or more fields of the main task; in response to the receiving, generating a notification C-task from the data; determining a recipient resource of the generated notification C-task; and sending, to the recipient resource, data characterizing the generated notification C-task, comprising presenting the one or more fields of the main task to the recipient resource.

Embodiment 12 is the dynamic modeler of any one of embodiments 5-11, wherein the communicator task is one of: an initiator C-task, wherein the initiator C-task triggers a main task and causes the dynamic modeler to send data characterizing the triggered main task to a recipient resource of the initiator C-task; or a chat C-task, wherein a chat C-task allows two resources of the integrated-solution platform to communicate in real-time, wherein each chat C-task is associated with a particular main task of the integrated-solution platform and the contextual data of the particular main task.

Embodiment 13 is the dynamic modeler of any one of embodiments 1-12, wherein the dynamic modeler is further configured to: automatically detecting, by the rule monitor, one or more discrepancies; receive, by the rule monitor, a task to query the set terms of the transaction recorded in the smart contract; selecting one or more dynamic rule options according to the set terms of the transaction; and presenting the selected dynamic rule options to the user.

Embodiment 14 is the dynamic modeler of any one of embodiments 1-13, wherein presenting dynamic rule options comprises: automatically detecting, by the rule monitor, one or more discrepancies in the single dynamic final event of the main task, according to one or more established rules of the dynamic modeler; selecting, by the rule monitor, the one or more dynamic rule options for presentation to the user; and presenting the selected dynamic rule options to the user.

Embodiment 15 is the dynamic modeler of any one of embodiments 1-14, wherein the operations further comprise automatically identifying, by the rule monitor and in response to the second dynamic input request, a next resource based on the single dynamic final event.

Embodiment 16 is the dynamic modeler of any one of embodiments 1-15, wherein the dynamic modeler is configured to support resources comprising one or more of individual users of the integrated-solution platform or devices, wherein the devices include one or more devices communicatively coupled to the integrated-solution platform including IoT devices and non-IoT devices.

Embodiment 17 is the dynamic modeler of any one of embodiments 1-16, wherein saving a model to a smart contract comprises: saving the model to a database; and saving the model to a smart contract, wherein one or more dynamically characterized data fields of the model can be queried from the model that is saved to the database, and compared against the model that is saved to the smart contract.

Embodiment 18 is the dynamic modeler of any one of embodiments 1-17, wherein saving the model to a smart contract comprises saving particular steps of a transaction of the model to the smart contract and not saving other particular steps of the transaction of the model to the smart contract.

Embodiment 19 is a system comprising: one or more computers and one or more storage devices storing instructions that are operable, when executed by the one or more computers, to cause the one or more computers to perform the operations of the dynamic modeler of any one of embodiments 1 to 18.

Embodiment 20 is a method comprising the operations of the dynamic modeler of any one of embodiments 1 to 18.

Embodiment 20 is a computer storage medium encoded with a computer program, the program comprising instructions that are operable, when executed by data processing apparatus, to cause the data processing apparatus to perform the operations of the dynamic modeler of any one of embodiments 1 to 18.

Embodiment 21 is a dynamic modeler comprising a framework for application and user interface modeling for dynamic user interaction on a single platform.

Embodiment 22 is the dynamic modeler of embodiment 21, wherein the dynamic modeler is configured to generate i) a single shared first event, ii) a single shared dynamic cascading filter, and iii) a single shared final event, powered by an application's context and based on a user event triggering a dynamic process manager to auto-generate next main tasks and communicator tasks and their correspondent resources, to provide set standardized collaboration on a single integrated-solution platform.

Embodiment 23 is the dynamic modeler of any one of embodiments 21 or 22, wherein the dynamic modeler is configured to generate set standardized reporting, reconciliation, and output documents, and wherein the dynamic modeler is configured to provide the integrated-solution platform for IoT and non-IoT resources.

Embodiment 24 is the dynamic modeler of any one of embodiments 21-23, wherein the dynamic modeler features include i) a dynamic smart interface, ii) dynamic interaction types, iii) the dynamic process manager, iv) contextual dynamic data, and v) a dynamic report viewer that provides set standardized reporting, reconciliation, and output documents.

Embodiment 25 is the dynamic modeler of any one of embodiments 21-24, wherein the dynamic modeler having a single dynamic first event/single dynamic final event and intelligent resource interaction, combined with its shared standard transaction parameters including set or revised terms, a resource profile, and a transaction identifier, enables a constant creation of a single common model bound to a unique identifier of and for the model to be saved into a smart contract, wherein the unique identifier is selectively queried on demand by a resource to return, view or compare the set terms to be executed from the integrated-solution platform, wherein each transaction of the dynamic modeler is driven by main tasks and supported by communicator tasks that allow users to collaborate within a main task.

Embodiment 26 is the dynamic modeler of any one of embodiments 21-25, wherein the dynamic modeler is configured to provide single interactions that are common across application configurations and shared across the integrated-solution platform.

Embodiment 27 is the dynamic modeler of any one of embodiments 21-26, wherein the dynamic modeler is configured to query contextual data that has been created by multiple resources across the integrated-solution platform.

Embodiment 28 is the dynamic modeler of any one of embodiments 21-27, wherein the dynamic modeler is configured to perform operations in response to the dynamic interaction types comprising:

receiving a first dynamic input request with corresponding contextual inputs comprising data characterizing a single dynamic first event of the main task;

generating, in response to the first dynamic input request, a dynamic smart interface responding to the contextual inputs;

generating, in response to the first dynamic input request, a model comprising a single shared dynamic control load and dynamic data load responding to the contextual inputs; and receiving a second dynamic input request comprising data characterizing a single dynamic final event of the main task.

Embodiment 29 is the dynamic modeler of embodiment 28, wherein the dynamic modeler is configured to perform operations further comprising:

triggering, in response to the second dynamic input request, a dynamic process comprising a rule monitor, a smart task generator, and a smart contract; and presenting, to a user in response to the second dynamic input request, dynamic rule options comprising one or more of rejecting, approving, escalating, snoozing, or re-assigning the main task.

Embodiment 30 is a method comprising:

receiving a first dynamic input request with corresponding contextual inputs comprising data characterizing a single dynamic first event of the main task;

generating, in response to the first dynamic input request, a dynamic smart interface responding to the contextual inputs;

generating, in response to the first dynamic input request, a model comprising a single shared dynamic control load and dynamic data load responding to the contextual inputs; and receiving a second dynamic input request comprising data characterizing a single dynamic final event of the main task.

Embodiment 31 is the method of embodiment 30, further comprising:

triggering, in response to the second dynamic input request, a dynamic process comprising a rule monitor, a smart task generator, and a smart contract; and presenting, to a user in response to the second dynamic input request, dynamic rule options comprising one or more of rejecting, approving, escalating, snoozing, or re-assigning the main task.

Embodiment 32 is a computer storage medium encoded with a computer program, the program comprising instructions that are operable, when executed by data processing apparatus, to cause the data processing apparatus to perform the operations of the dynamic modeler of any one of embodiments 21 to 29.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A dynamic modeler comprising a framework for application and user interface modeling for dynamic user interaction on a single platform by configuration only, wherein the dynamic modeler is configured to generate, for all applications, i) a single shared first event, ii) a single shared dynamic cascading filter, and iii) a single shared final event, powered by an application's context and based on a user event triggering a dynamic process manager to auto-generate next main tasks and communicator tasks and their correspondent resources, to provide set standardized collaboration on a single integrated-solution platform, wherein the dynamic modeler is configured to generate set standardized reporting, reconciliation, and output documents, and wherein the dynamic modeler is configured to provide the integrated-solution platform for IoT and non-IoT resources, wherein the dynamic modeler features include i) a dynamic smart interface, ii) dynamic interaction types, iii) the dynamic process manager, iv) contextual dynamic data, and v) a dynamic report viewer that provides set standardized reporting, reconciliation, and output documents, wherein the dynamic modeler having a single dynamic first event/single dynamic final event and intelligent resource interaction, combined with its shared standard transaction parameters including set or revised terms, a resource profile, and a transaction identifier, enables a constant creation of a single common model bound to a unique identifier of and for the model to be saved into a smart contract, wherein the unique identifier is selectively queried on demand by a resource to return, view or compare the set terms to be executed from the integrated-solution platform, wherein each transaction of dynamic modeler is driven by main tasks and supported by communicator tasks that allow users to collaborate within a main task, wherein the dynamic modeler is configured to provide single interactions that are common across application configurations and shared across the integrated-solution platform, wherein the dynamic modeler is configured to query contextual data that has been created by multiple resources across the integrated-solution platform, and wherein the dynamic modeler is configured to perform operations in response to the dynamic interaction types comprising:

receiving a first dynamic input request with corresponding contextual inputs comprising data characterizing a single dynamic first event of the main task;

generating, in response to the first dynamic input request, a dynamic smart interface responding to the contextual inputs;

generating, in response to the first dynamic input request, a model comprising a single shared dynamic control load and dynamic data load responding to the contextual inputs;

receiving a second dynamic input request comprising data characterizing a single dynamic final event of the main task;

triggering, in response to the second dynamic input request, a dynamic process comprising a rule monitor, a smart task generator, and a smart contract; and presenting, to a user in response to the second dynamic input request, dynamic rule options comprising one or more of rejecting, approving, escalating, snoozing, or re-assigning the main task.

2. The dynamic modeler of claim 1, wherein the contextual inputs comprise:
a resource profile,
a task profile,
a transaction profile, and
an output model profile.

3. The dynamic modeler of claim 2, wherein the output model profile comprises a page name, one or more section names, one or more field names and computed fields, and a page sequence.

4. The dynamic modeler of claim 1, wherein the operations further comprise generating, in response to the second dynamic request input, a standard reconciliation report which automatically emphasizes any data field discrepancies detected by the rule monitor.

5. The dynamic modeler of claim 1, wherein the operations further comprise:
receiving, prior to the second dynamic input request, a C-input comprising data characterizing the main task and a communicator task associated with the main task, wherein the C-input is triggered by an initiating resource.

6. The dynamic modeler of claim 5, wherein the initiating resource is the rule monitor of the dynamic modeler, and wherein the operations further comprise:
automatically generating, by the rule monitor and using the data in the C-input, the communicator task;
automatically determining, by the rule monitor, a recipient resource of the generated communicator task;
sending, to the recipient resource, data characterizing the generated communicator task;
receiving, from the recipient resource, data characterizing the communicator task, wherein the communicator task has been completed by the recipient resource; and
automatically validating, by the rule monitor, one or more fields of the completed communicator task.

7. The dynamic modeler of claim 5, wherein the communicator task is a collection C-task, and wherein the operations further comprise:
presenting, to the initiating resource in response to the C-input, an interface for selecting one or more fields of the main task;
receiving data characterizing the one or more selected fields;
in response to the receiving, generating a collection C-task from the data, comprising generating a targeted field action form comprising the selected fields;
determining a recipient resource of the generated collection C-task;
sending, to the recipient resource, data characterizing the generated collection C-task, comprising presenting the targeted field action form to the recipient resource; and
receiving data characterizing completed fields of the new communicator task, the completed fields having been submitted by the recipient resource.

8. The dynamic modeler of claim 7, wherein the operations further comprise:
presenting, to the initiating resource, an interface to validate the completed fields; and
posting data derived from the completed fields into the main task.

9. The dynamic modeler of claim 7, wherein the operations further comprise:
receiving, data characterizing updated fields of the new communicator task, the updated fields having been submitted by the initiating resource in response to receiving the completed fields;
automatically determining, by the rule monitor, a discrepancy between the completed fields and the updated fields; and
sending data characterizing a notification of the discrepancy to the initiating resource, the recipient resource, or both.

10. The dynamic modeler of claim 5, wherein the communicator task is a decision C-task, and wherein the operations further comprise:
receiving data characterizing one or more proposed responses corresponding to respective fields of the main task;
in response to the receiving, generating a decision C-task from the data;
determining a recipient resource of the generated decision C-task;
sending, to the recipient resource, data characterizing the generated decision C-task, comprising presenting the proposed responses to the recipient resource; and
receiving response data characterizing, for each proposed response, either i) an approval of the proposed response, ii) a rejection of the proposed response, or iii) a revision of the proposed response, the response data having been submitted by the recipient resource.

11. The dynamic modeler of claim 5, wherein the communicator task is a notification C-task, and wherein the operations further comprise:
receiving data characterizing one or more fields of the main task;
in response to the receiving, generating a notification C-task from the data;
determining a recipient resource of the generated notification C-task; and
sending, to the recipient resource, data characterizing the generated notification C-task, comprising presenting the one or more fields of the main task to the recipient resource.

12. The dynamic modeler of claim 5, wherein the communicator task is one of:
an initiator C-task, wherein the initiator C-task triggers a main task and causes the dynamic modeler to send data characterizing the triggered main task to a recipient resource of the initiator C-task; or
a chat C-task, wherein a chat C-task allows two resources of the integrated-solution platform to communicate in real-time, wherein each chat C-task is associated with a particular main task of the integrated-solution platform and the contextual data of the particular main task.

13. The dynamic modeler of claim 1, wherein the dynamic modeler is further configured to:
   automatically detecting, by the rule monitor, one or more discrepancies;
   receive, by the rule monitor, a task to query the set terms of the transaction recorded in the smart contract;
   selecting one or more dynamic rule options according to the set terms of the transaction; and
   presenting the selected dynamic rule options to the user.

14. The dynamic modeler of claim 1, wherein presenting dynamic rule options comprises:
   automatically detecting, by the rule monitor, one or more discrepancies in the single dynamic final event of the main task, according to one or more established rules of the dynamic modeler;
   selecting, by the rule monitor, the one or more dynamic rule options for presentation to the user; and
   presenting the selected dynamic rule options to the user.

15. The dynamic modeler of claim 1, wherein the operations further comprise:
   automatically identifying, by the rule monitor and in response to the second dynamic input request, a next resource based on the single dynamic final event.

16. The dynamic modeler of claim 1, wherein the dynamic modeler is configured to support resources comprising one or more of individual users of the integrated-solution platform or devices, wherein the devices include one or more devices communicatively coupled to the integrated-solution platform including IoT devices and non-IoT devices.

17. The dynamic modeler of claim 1, wherein saving a model to a smart contract comprises:
   saving the model to a database; and
   saving the model to a smart contract, wherein
   one or more dynamically characterized data fields of the model can be queried from the model that is saved to the database, and compared against the model that is saved to the smart contract.

18. The dynamic modeler of claim 17, wherein saving the model to a smart contract comprises saving particular steps of a transaction of the model to the smart contract and not saving other particular steps of the transaction of the model to the smart contract.

* * * * *